United States Patent
Kato et al.

(10) Patent No.: US 7,406,326 B2
(45) Date of Patent: Jul. 29, 2008

(54) MOBILE COMMUNICATION SYSTEM AND CONTROL STATION

(75) Inventors: Yasuhiro Kato, Yokohama (JP); Kazunori Obata, Yokosuka (JP); Shinji Ueda, Yokosuka (JP)

(73) Assignee: NTT Docomo, Inc., Tokyo (JP)

( * ) Notice: Subject to any disclaimer, the term of this patent is extended or adjusted under 35 U.S.C. 154(b) by 784 days.

(21) Appl. No.: 10/866,276

(22) Filed: Jun. 10, 2004

(65) Prior Publication Data

US 2004/0266448 A1    Dec. 30, 2004

(30) Foreign Application Priority Data

Jun. 11, 2003    (JP)    ............... P2003-166942

(51) Int. Cl.
H04Q 7/20    (2006.01)
(52) U.S. Cl. ............ 455/509; 455/422.1; 455/403; 455/450; 455/452.1; 455/452.2; 370/328; 370/329; 370/330; 370/336; 370/343
(58) Field of Classification Search ............ 455/509, 455/422.1, 403, 450, 452.1, 452.2, 511, 515, 455/414.1, 500, 517, 434, 453, 560, 550.1, 455/426.1, 426.2; 370/328, 329, 330, 336, 370/343, 345, 348
See application file for complete search history.

(56) References Cited

U.S. PATENT DOCUMENTS 7,194,267 B2 * 3/2007 Torsner et al. ............ 455/442

2003/0153334 A1   8/2003 Hokao
2005/0053081 A1 * 3/2005 Andersson et al. ......... 370/401

FOREIGN PATENT DOCUMENTS

| JP | 2000-175258 | 6/2000 |
| JP | 2002-271847 A | 9/2002 |
| JP | 2003-163970 | 6/2003 |
| WO | WO 00/16504 A1 | 3/2000 |
| WO | WO 02/31916 A1 | 4/2002 |

OTHER PUBLICATIONS

Office Action from the Japanese Patent Office in the corresponding Japanese patent application, dated Jan. 22, 2008 (2 pgs.), with full translation (Five (5) pgs.).
Chinese Office Action dated Aug. 4, 2006.
Chinese Office Action dated Feb. 9, 2007.

* cited by examiner

Primary Examiner—Keith T Ferguson
(74) Attorney, Agent, or Firm—Brinks Hofer Gilson & Lione

(57) ABSTRACT

In a mobile communication system 1 comprising a control station 204, a base station 201, and a mobile station 202, in which the control station 204 sets a dedicated channel with the mobile station 202 via the base station 201, the control station 204 comprises dedicated channel control means for performing a dedicated channel retention operation in which a second dedicated channel, which is different to a first dedicated channel, is set during communication through the first dedicated channel in such a manner that both the first and second dedicated channels are retained for a predetermined time period after the second dedicated channel is set.

18 Claims, 8 Drawing Sheets

MOBILE COMMUNICATION SYSTEM AND CONTROL STATION

BACKGROUND OF THE INVENTION

1. Field of the Invention

The present invention relates to a mobile communication system constituted by a control station, a base station, and a mobile station, and the control station provided in this mobile communication system.

2. Related Background Art

In a conventional mobile communication system constituted by a control station, a base station, and a mobile station, various types of multimedia signal, from voice communication to high-speed packet communication, can be transmitted in an integrated manner, and thus a plurality of services, also known as a multi-call service, can be provided simultaneously (for example, FOMA (registered trademark): freedom of mobile multimedia access). A mobile communication system based on FOMA is known as a third generation mobile communication system. In order to realize various services according to the needs of a user, this mobile communication system employs a system architecture according to which an optimum transmission speed is determined by the control station in comprehensive consideration of the content of the service request, the packet transmission speed, the functional capability of the terminal, the network condition, and so on, whereupon a dedicated channel corresponding to the determined optimum transmission speed is selected and allocated.

In conventional mobile communication systems, a technique relating to changeover of the dedicated channel during communication is known. According to this technique, a transition is made to a radio channel having a different transmission capability in accordance with the amount of information that is transferred over the radio channel that is currently performing communication (see Patent Document 1, for example).

[Patent Document 1] JP-A-2002-271847

SUMMARY OF THE INVENTION

An object of this conventional mobile communication system is to improve the transmission efficiency of the radio channel, and hence a transition is made to a radio channel which is suited to the transmission capacity required of the communicating radio channel. However, neither the transition timing nor the transition procedure have been taken into consideration, and as a result, the time required to change the radio channel (the changeover period) varies according to the manner in which the radio channel changeover timing is set, leading to the following possible problems.

When the radio channel changeover timing is retarded, the changeover period lengthens, and since the changeover period directly affects the period in which the system user is able to utilize a service, the user may be given the impression of a deterioration in response as the changeover period lengthens. By advancing the changeover timing, the changeover period shortens, but in this case, although the response improves, the likelihood of a signal indicating changeover of the radio channel not being received by the mobile station increases. When the signal indicating radio channel changeover is not received by the mobile station, the radio channel is changed only at the base station, leading to a mismatched condition in the radio channels of the base station and mobile station such that radio synchronization cannot be established. In this case, a procedure is required to reset a dedicated channel while on a common channel, leading to a dramatic deterioration in response.

Hence in conventional mobile communication systems, there is a trade-off between shortening the response time and preventing mismatched conditions, and it is therefore difficult to achieve both.

The present invention has been designed to solve these problems, and it is an object thereof to provide a mobile communication system and a control station comprised in this mobile communication system which are capable of shortening the response time when a radio channel is changed during communication, and eliminating mismatched conditions in a base station and a mobile station.

To solve the problems described above, the present invention is a mobile communication system comprising a control station, a base station, and a mobile station, in which the control station sets a dedicated channel with the mobile station via the base station, wherein the control station comprises dedicated channel control means for setting a second dedicated channel which is different to a first dedicated channel during communication through the first dedicated channel in such a manner that both the first and second dedicated channels are retained for a predetermined time period after the second dedicated channel is set.

In this mobile communication system, a period in which both the first and second dedicated channels are retained is secured in the control station following setting of the second dedicated channel, and hence an opportunity can be secured for the mobile station to change the dedicated channel before the dedicated channel is changed in the control station. Hence the dedicated channel can be changed in the control station and base station after the dedicated channel is changed in the mobile station.

The dedicated channel control means may also retain the first and second dedicated channels, whereby communication is performed through the first and second dedicated channels, for a period lasting from setting of the second dedicated channel to reception in the control station of a dedicated channel changeover completion notification or a changeover impossible notification from the mobile station.

In so doing, the control station can be set to a double standby condition in which both the first and second dedicated channels are retained until notification of the completion or non-completion of the dedicated channel changeover is received from the mobile station.

Further, in any of the mobile communication systems described above, the control station may also comprise mode setting means for setting an operating mode. This mode setting means sets a dedicated channel retention mode for activating the dedicated channel control means when notified of the presence of a radio resource for setting a different dedicated channel to the communicating dedicated channel, and sets a timing specification mode for informing the base station and mobile station of a dedicated channel changeover timing when notified of the absence of a radio resource.

By providing the mode setting means, the control station performs a dedicated channel retention operation when a radio resource is available, and when no radio resource is available, the control station informs the base station and mobile station of the dedicated channel changeover timing without performing the dedicated channel retention operation.

The present invention also provides a control station provided in a mobile communication system comprising the control station, a base station, and a mobile station, in which the control station sets a dedicated channel with the mobile station via the base station. This control station comprises dedicated channel control means for setting a second dedicated channel which is different to a first dedicated channel during communication through the first dedicated channel in such a manner that both the first and second dedicated channels are retained for a predetermined time period after the second dedicated channel is set.

This control station may further comprise mode setting means for setting an operating mode. The mode setting means sets a dedicated channel retention mode for activating the dedicated channel control means when notified of the presence of a radio resource for setting a different dedicated channel to the communicating dedicated channel, and sets a timing specification mode for informing the base station and mobile station of a dedicated channel changeover timing when notified of the absence of a radio resource.

According to the present invention as described in detail above, when a communicating dedicated channel is changed, no mismatched conditions occur in the radio channels of the mobile station and base station, and hence response during a dedicated channel changeover is favorable.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

An embodiment of the present invention will now be described. Note that the same reference symbols are used for identical elements, and redundant description thereof is omitted.

Figure 2:
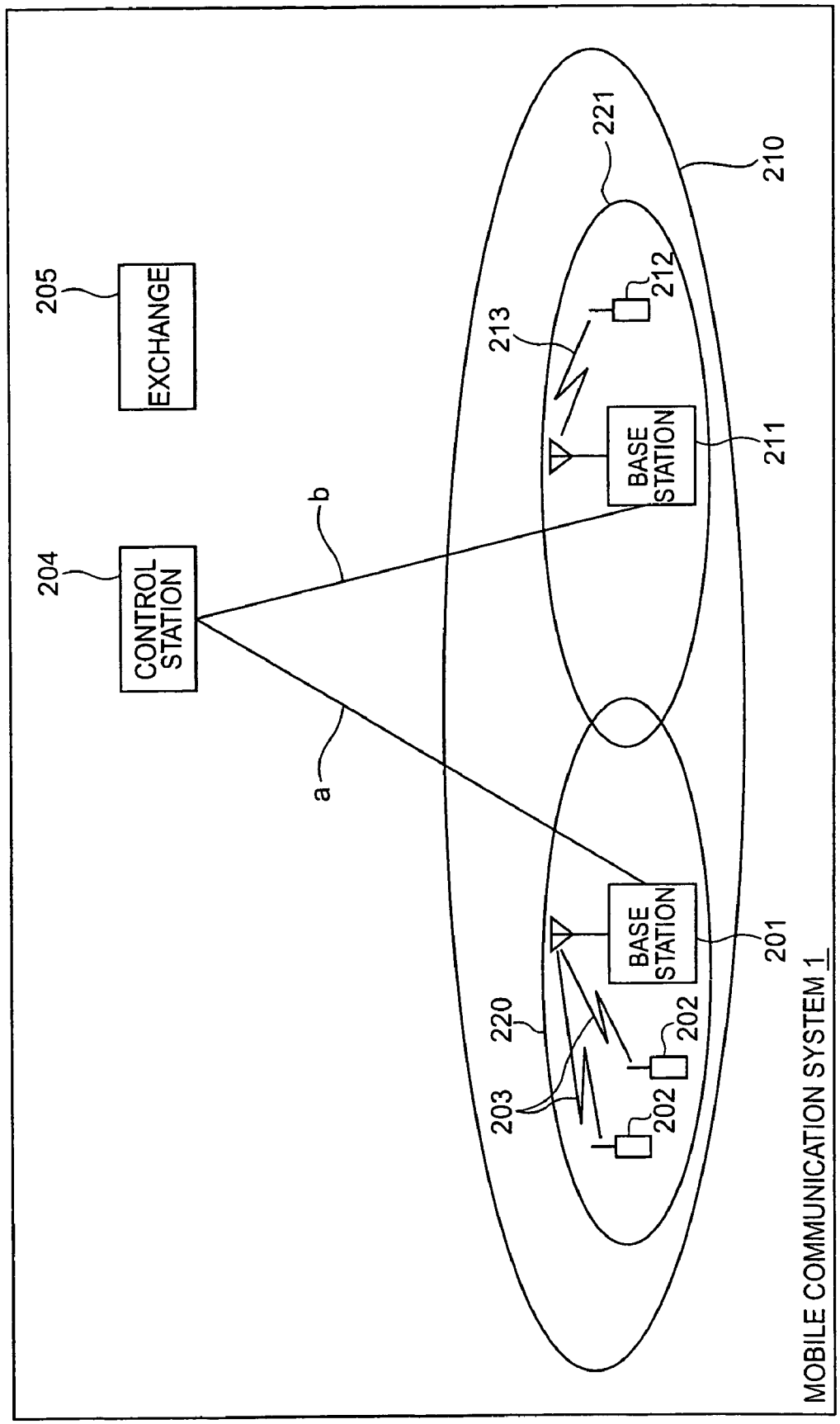
FIG. 2 is a system block diagram of a mobile communication system according to an embodiment of the present invention.

FIG. 2 is a system block diagram of a mobile communication system 1 according to an embodiment of the present invention. As shown in FIG. 2, the mobile communication system 1 according to this embodiment comprises a plurality of base stations 201, 211, a plurality of mobile stations 202, 212, a control station 204, and an exchange 205.

The base stations 201, 211 are disposed within a paging area 210 under the management of the control station 204, and thus communicate with the mobile stations 202, 212 that are visiting cells 220, 221 covered by the base stations 201, 211 respectively. The control station 204 is connected to the base stations 201, 211 via transmission paths a, b. The control station 204 controls operations of the base stations 201, 211 and mobile stations 202, 212, and sets dedicated channels 203, 213 between itself and the mobile stations 202, 212 via the base stations 201, 211. The exchange 205 is connected to the control station 204. Lines on the transmission paths a, b connecting the base stations 201, 211 to the control station 204 are set logically for each dedicated radio channel (note that for the sake of convenience, the transmission paths a, b are illustrated as single lines in FIG. 2).

Figure 3:
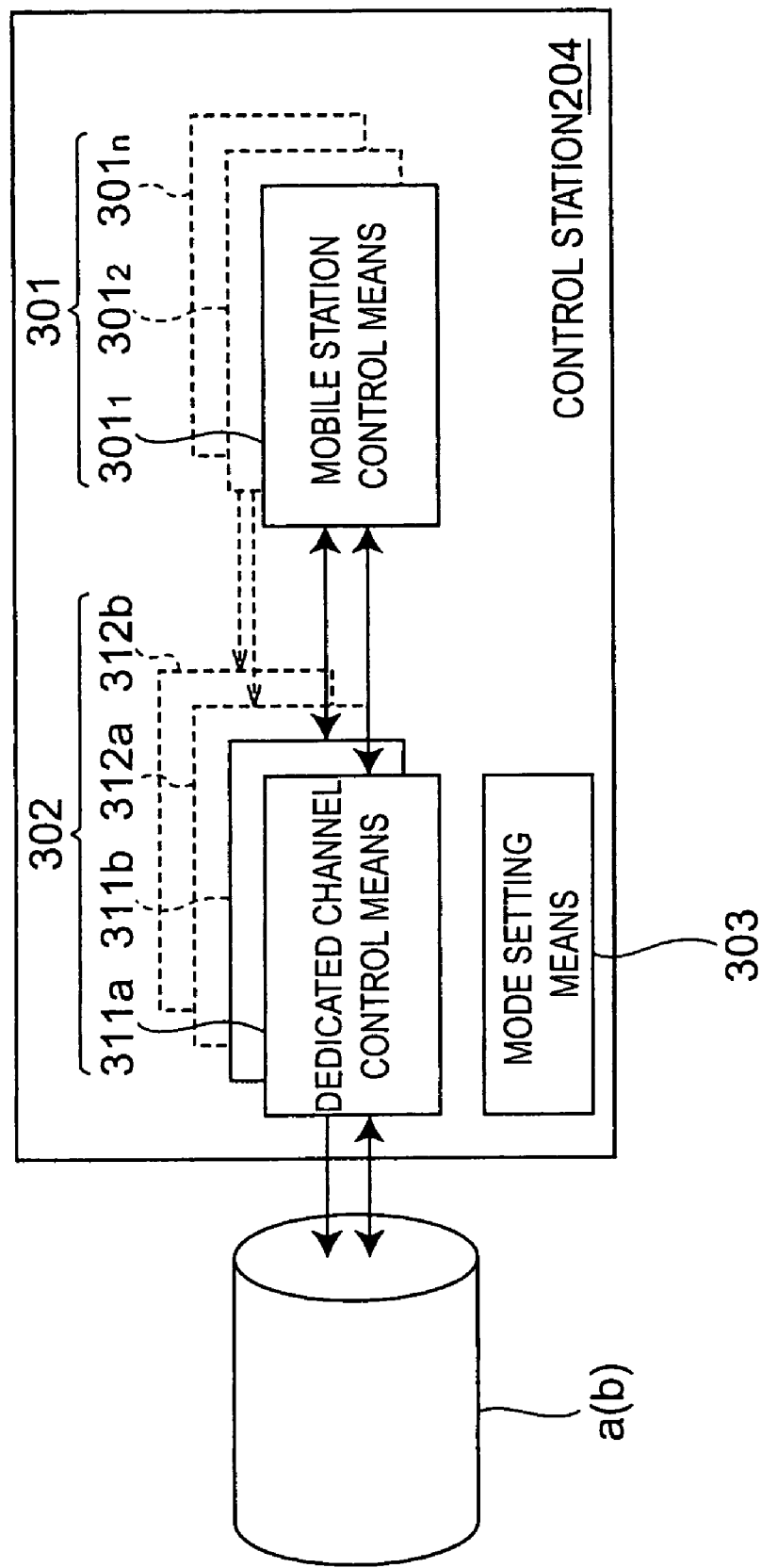
FIG. 3 is a block diagram showing the internal constitution of the control station.

As shown in FIG. 3, the control station 204 comprises mobile station control means 301, dedicated channel control means 302, and mode setting means 303. The mobile station control means 301 is provided for each mobile station capable of communicating with the base stations 201, 211, n (where n>two or more) mobile station control means $301_1$ to $301_n$ being provided in FIG. 3. Each mobile station control means $301_1$ to $301_n$ transmits and receives signals to and from the mobile stations 202, 212 via the respective base stations 201, 211, and performs various types of radio control, such as authentication processing and handover, for each mobile station. Further, when the dedicated channels 203, 213 are set by the dedicated channel control means 302, the mobile station control means $301_1$ to $301_n$ select an appropriate dedicated channel corresponding to the content of a service request from the mobile stations 202, 212, the mobile station capacity, the congestion condition of the lines within the system, and so on, and instruct the dedicated channel control means 302 to set the selected dedicated channel.

The dedicated channel control means 302 operates in response to the instruction from the mobile station control means 301 to set (establish) the dedicated channels 203, 213 with the mobile stations 202, 212 via the base stations 201, 211. The dedicated channel control means 302 is provided for each set dedicated channel. In FIG. 3, dedicated channel control means 311a, 311b are provided for the mobile station control means $301_1$, and dedicated channel control means 312a, 312b are provided for the mobile station control means $301_2$. In the mobile communication system 1, an instruction is issued from each mobile station control means $301_1$ to $301_n$ to the two corresponding dedicated channel control means, whereby integrated (concurrent) communication is performed along the two dedicated channels set by the dedicated channel control means. In other words, during reception, signals are always received from both of the dedicated channels established by the two dedicated channel control means, and during transmission, an identical signal is transmitted along both of the dedicated channels.

The mode setting means 303 sets an operating mode of the control station 204 in accordance with the content of a dedicated channel changeover preparation response from the base station 201, to be described hereinafter.

Next, an operating procedure which is a feature of the mobile communication system 1 according to this embodiment will be described. Note that since the base stations 201, 211 perform identical operations, an example of the operations of the base station 201, mobile station 202, and control station 204 will be described below.

First Operating Procedure

Figure 1:
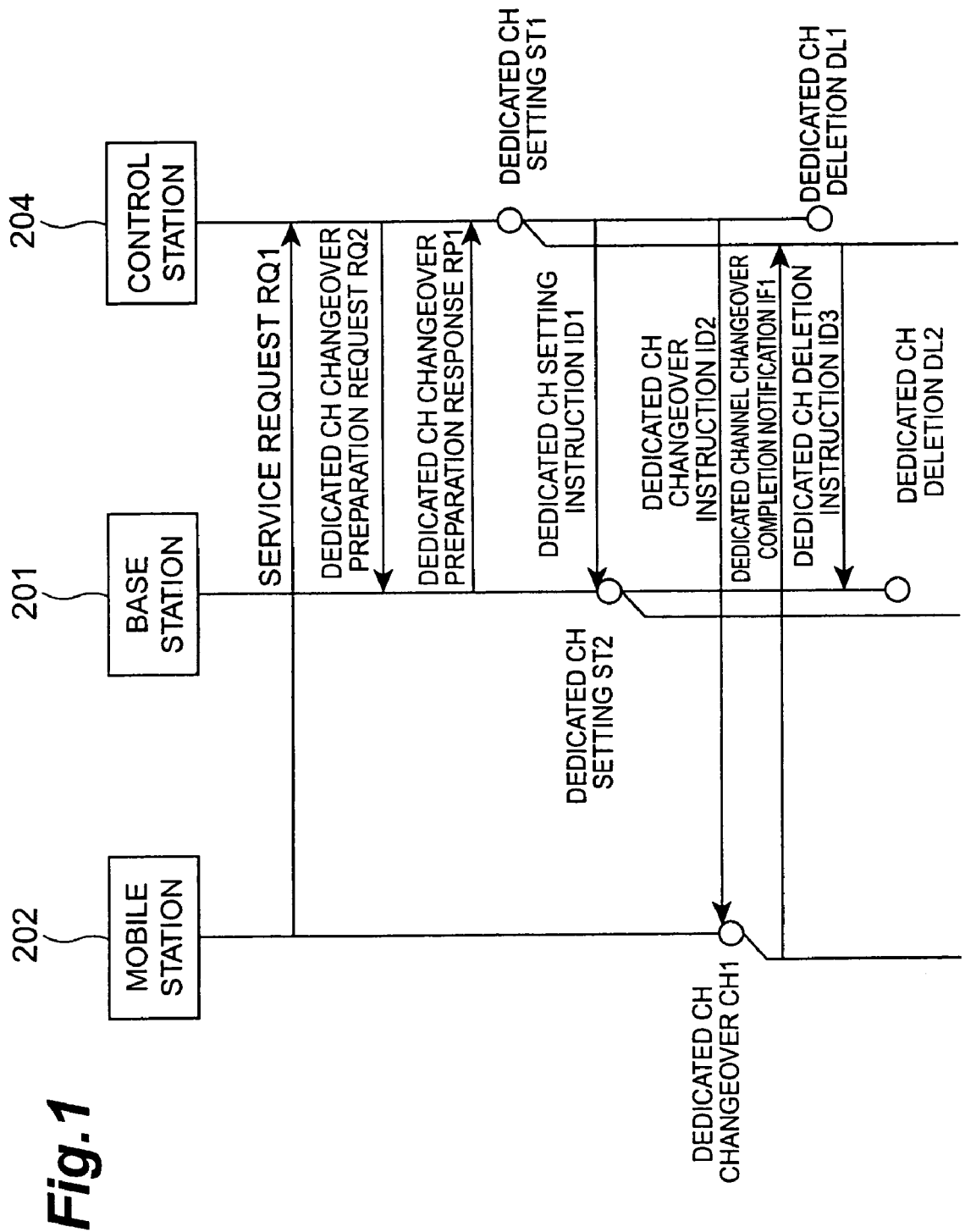
FIG. 1 is a chart showing an operating procedure of a mobile station, a base station, and a control station during a changeover of a communicating dedicated channel.

FIG. 1 is a chart showing an operating procedure of the mobile station 202, base station 201, and control station 204 executed in the mobile communication system 1 during a changeover of a dedicated channel during communication (to a dedicated channel with a different transmission speed). Note that "CH" in the drawing indicates "channel".

First, the mobile station 202 transmits a service request RQ1, which serves as a trigger for a dedicated channel changeover, to the control station 204. Examples of the service request RQ1 include a voice service request during control signal communication, a request to add a packet service during voice communication, a request for increased transmission speed during the packet service, and so on. Note that in this embodiment, the service request RQ1 serves as a trigger from the mobile station 202, but may be a trigger from the exchange 205 or a trigger from the control station 204 itself.

Next, the control station 204 receives the service request RQ1 and detects the content of the received service request RQ1. In the following step, the mobile station control means $301_1$ corresponding to the mobile station which transmitted the service request RQ1 (i.e. the mobile station 202) is activated to select an optimum dedicated channel (for example, the dedicated channel having the most favorable transmission efficiency) for the content of the service request RQ1, and then transmits a dedicated channel changeover preparation request RQ2 to the base station 201. By transmitting the dedicated channel changeover preparation request RQ2, the control station 204 inquires of the base station 201 as to whether it is possible to set an optimum dedicated channel for the content of the service request RQ1 which is different to the communicating dedicated channel.

Having received the dedicated channel changeover preparation request RQ2, the base station 201 determines whether or not it is possible to set a different dedicated channel to the communicating dedicated channel, and notifies the control station 204 of the determination result by transmitting a dedicated channel changeover preparation response RP1 thereto (it is assumed here that a radio resource enabling a different dedicated channel to be set exists). In the following step, having determined from the dedicated channel changeover preparation response RP1 that a different dedicated channel may be set, the mode setting means 303 sets a dedicated channel retention mode. In response, the mobile station control means 301 of the control station 204 newly activates a different dedicated channel control means (the dedicated channel control means 311b, for example) to the dedicated channel control means (the dedicated channel control means 311a, for example) which set the communicating dedicated channel, and thus dedicated channel setting ST1 is performed by the activated dedicated channel control means. In the period from the dedicated channel setting ST1 to a dedicated channel deletion DL1, both the communicating dedicated channel (first dedicated channel) and the different dedicated channel (second dedicated channel) are retained in the control station 204 by the dedicated channel control means 311a, 311b.

Following the dedicated channel setting ST1, the control station 204 transmits a dedicated channel setting instruction ID1 to the base station 201, whereby dedicated channel setting ST2 for setting a different dedicated channel to the communicating dedicated channel is performed similarly in the base station 201. In the following step, the control station 204 transmits a dedicated channel change over instruction ID2 to the mobile station 202. Note that here, it is assumed that the mobile station 202 receives the dedicated channel changeover instruction ID2 without error, and performs a dedicated channel changeover CH1 corresponding to the dedicated channel changeover instruction ID2.

Having changed the communicating dedicated channel to the different dedicated channel in the dedicated channel changeover CH1, the mobile station 202 transmits a dedicated channel change over completion notification IF1 to the control station 204. The control station 204 awaits reception of the dedicated channel changeover completion notification IF1, performs the dedicated channel deletion DL1 to delete the pre-changeover dedicated channel, and then transmits a dedicated channel deletion instruction ID3 to the base station 201. Having received the dedicated channel deletion instruction ID3, the base station 201 performs a dedicated channel deletion DL2 to delete the pre-changeover dedicated channel, whereupon the operation to change the communicating dedicated channel is complete.

In this series of operations, the operation performed by the dedicated channel control means 302 of the control station 204 to retain the first and second dedicated channels (to be referred to as "dedicated channel retention operation" hereinafter) is performed over a predetermined time period, thereby securing a period (to be referred to as "double retention period" hereinafter) in which both the pre-changeover and post-changeover dedicated channels are retained. As a result, an opportunity can be secured for the mobile station 202 to change the dedicated channel upon reception of an instruction to change the dedicated channel transmitted thereto from the control station 204 before the dedicated channel is changed in the control station 204. Thus the dedicated channel is not changed in the base station 201 alone, which means that a mismatched condition in the base station 201 and mobile station 202 can be prevented.

Moreover, changeover of the dedicated channel in the control station 204 and base station 201 can be performed when changeover of the dedicated channel in the mobile station 202 is already complete, and hence the dedicated channel can be changed with the base station 201 and mobile station 202 in synchronization, thereby shortening the changeover operation and preventing a deterioration in response during a dedicated channel changeover.

The double retention period is set to last at least from the dedicated channel setting ST1 to reception of the dedicated channel changeover completion notification IF1 from the mobile station 202. Hence the first and second dedicated channels are retained in the control station 204 until changeover has been performed in the mobile station. Thus, as described above, the control station 204 and base station 201 wait for the changeover completion notification IF1 from the mobile station 202, and are able to delete the pre-changeover dedicated channel (execute the dedicated channel deletions DL1, DL2) immediately after receiving the changeover completion notification IF1. As a result, mismatched conditions are prevented from occurring in the base station 201 and mobile station 202, whereby the time required to change the dedicated channel is held to a minimum, and thus the response time is favorable. This point will be described in further detail with reference to FIG. 8.

Figure 8:
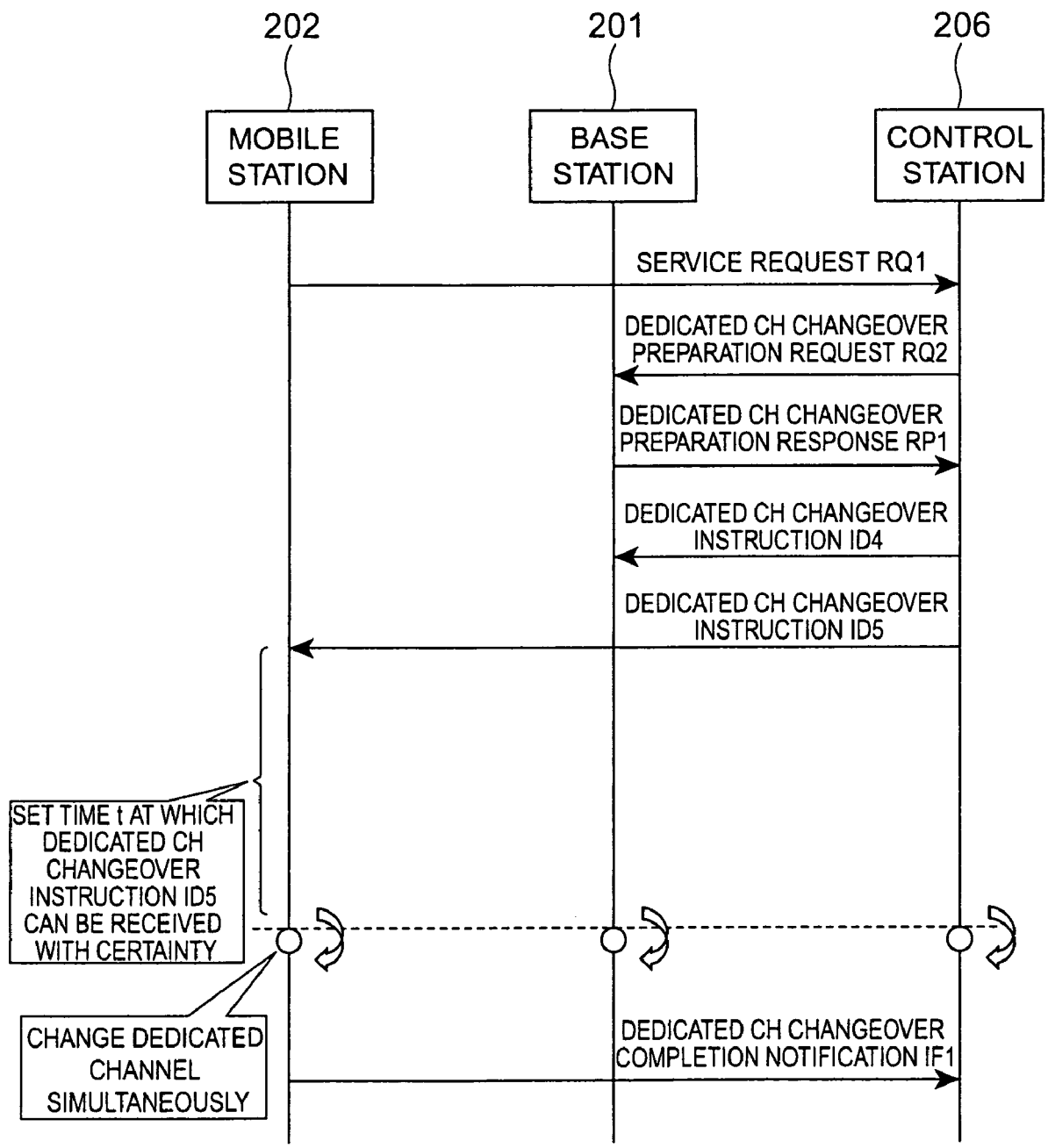
FIG. 8 is a chart showing, as a comparison with the present invention, an operating procedure of a mobile station, a base station, and a control station during a changeover of a communicating dedicated channel in which a timing t is specified by the control station.

As a comparison with the present invention, FIG. 8 is a chart showing an operating procedure of the mobile station 202, the base station 201, and a control station 206 in a case where the communicating dedicated channel is changed upon specification of a timing t from the control station 206. The control station 206 is constituted identically to the control station 204 except for the omission of the mode setting means 303.

In FIG. 8, the dedicated channel changeover preparation request RQ2 is transmitted to the base station 201 following reception of the service request RQ1 in the control station 206, similarly to the procedure described in FIG. 1. Then, after the dedicated channel changeover preparation response RP1 has been transmitted to the control station 206, the control station 206 transmits dedicated channel changeover instructions ID4, ID5 to the base station 201 and mobile station 202 respectively, specifying a timing t. Since the mode setting means 303 is not provided in the control station 206, the dedicated channel changeover instructions ID4, ID5 are transmitted without setting an operating mode. By transmitting the dedicated channel changeover instructions ID4, ID5, the control station 206 instructs the base station 201 and mobile station 202 to change the dedicated channel. The timing t is set in consideration of the dedicated channel changeover instruction ID5 being received in the mobile station 202 (to ensure that the mobile station 202 is capable of receiving the dedicated channel changeover instruction ID5). This is due to the fact that a time required for retransmission on a lower layer must be estimated for signals transmitted to the mobile station when a radio error occurs.

However, by prioritizing reception of the dedicated channel changeover instruction ID5 in the mobile station 202, the timing t is retarded, and hence the time required for changeover of the dedicated channel increases. As a result, the user may be left with an unfavorable impression of the response time. By shortening the timing t, the response time can be improved, but the likelihood of the dedicated channel changeover notification not reaching the mobile station 202 increases. In short, when both the base station 201 and mobile station 202 perform a changeover simultaneously at the timing t, either a mismatched condition occurs in the dedicated channels, or the response time is adversely affected.

In the present application, on the other hand, the control station 204 and base station 201 wait for the changeover completion notification IF1 from the mobile station 202, and immediately delete the pre-changeover dedicated channel following reception thereof. Hence the minimum period required for changing the dedicated channel with the base station 201 and mobile station 202 in synchronization is secured. As a result, the period required for changing the dedicated channel with the base station 201 and mobile station 202 in synchronization can be shortened beyond that of the case shown in FIG. 8.

Second Operating Procedure

Figure 4:
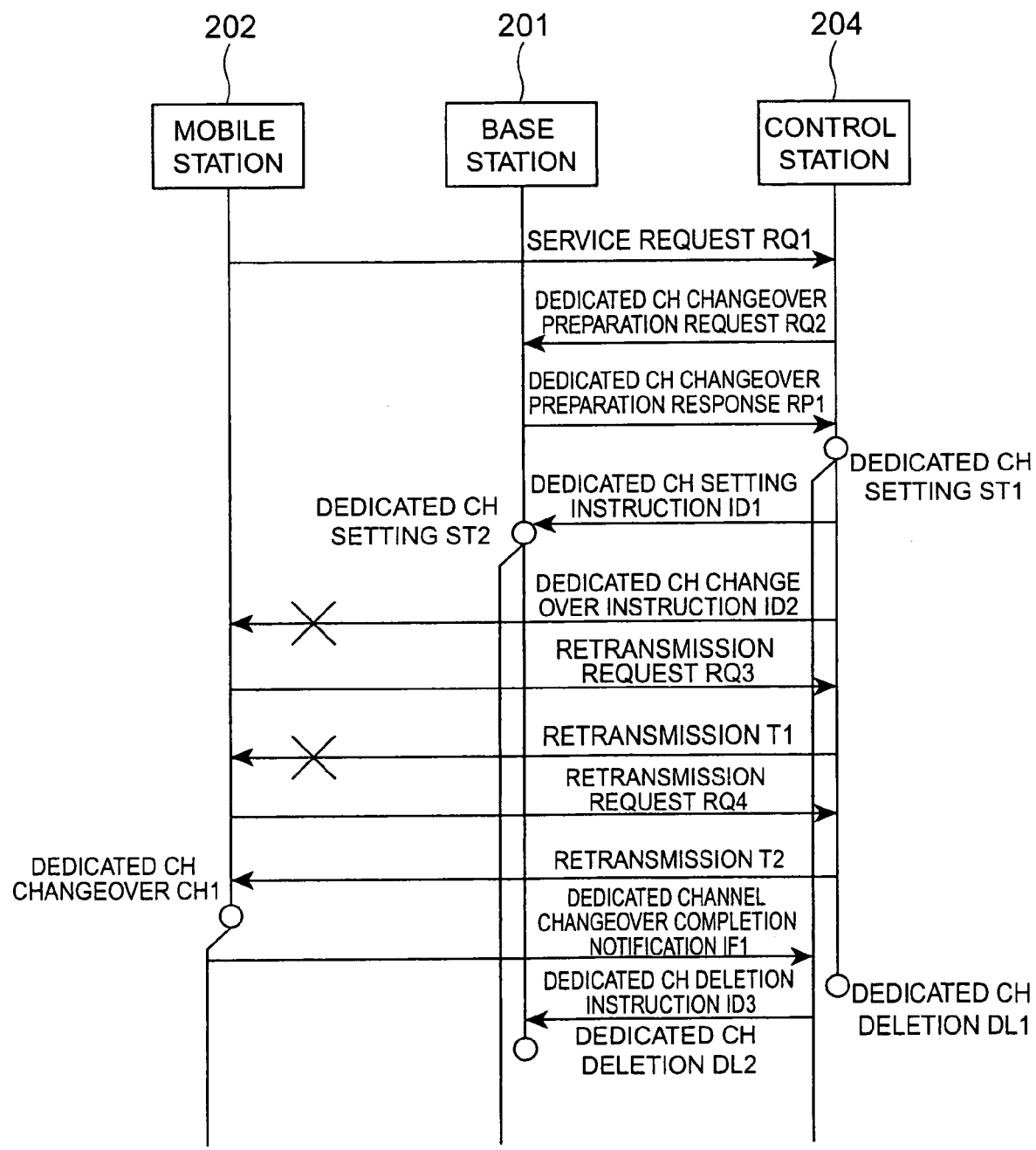
FIG. 4 is a chart showing a second operating procedure of the mobile station, base station, and control station during a changeover of the communicating dedicated channel.

A second operating procedure of the mobile communication system 1 executed during a changeover of the communicating dedicated channel will now be described. FIG. 4 is a chart showing a second operating procedure of the mobile station 202, base station 201, and control station 204 during a changeover of the communicating dedicated channel.

In FIG. 4, similar operations to those of FIG. 1 are performed from transmission of the service request RQ1 by the mobile station 202 to transmission of the dedicated channel setting instruction ID1 by the control station 204. Following transmission of the dedicated channel setting instruction ID1, FIG. 4 illustrates a case in which the dedicated channel setting ST2 is performed in the base station 201, whereupon the control station 204 transmits the dedicated channel changeover instruction ID2 to the mobile station 202, at which point a radio error occurs in the mobile station 202 in regard to the dedicated channel changeover instruction ID2 (the error is indicated in the drawing by "x")

Accordingly, a lower layer retransmission request RQ3 is transmitted from the mobile station 202. However, a lower layer retransmission T1 from the control station 204 fails (this failure is indicated in the drawing by "x"), and hence a further lower layer retransmission request RQ4 is transmitted from the mobile station 202, in response to which a lower layer retransmission T2 is performed by the control station 204. As a result of this retransmission T2, the mobile station 202 succeeds in receiving the dedicated channel changeover instruction ID2. In this case, the mobile station 202 succeeds in receiving the dedicated channel changeover instruction ID2 upon the retransmission T2, and performs the dedicated channel changeover CH1 in response to the dedicated channel changeover instruction ID2. Thereafter, transmission of the dedicated channel changeover completion notification IF1 by the mobile station 202, the dedicated channel deletion DL1 by the control station 204, transmission of the dedicated channel deletion instruction ID3 by the control station 204, and the dedicated channel deletion DL2 by the base station 201 are performed similarly to their counterparts in FIG. 1.

In this series of operations, lower layer retransmission from the control station 204 is performed repeatedly in response to a radio error concerning the dedicated channel changeover instruction ID2, and hence a longer period than expected is required for the mobile station 202 to receive the dedicated channel changeover instruction ID2. However, the dedicated channel retention operation is performed by the control station 204 likewise in this case, and hence the double retention period following the dedicated channel setting ST1 is secured. As a result, an opportunity can be secured for the mobile station 202 to change the dedicated channel upon reception of an instruction to change the dedicated channel transmitted thereto from the control station 204 before the dedicated channel is changed in the control station 204.

Thus the dedicated channel is not changed in the base station 201 alone, which means that a mismatched condition in the base station 201 and mobile station 202 can be prevented. Moreover, changeover of the dedicated channel in the control station 204 and base station 201 can be performed when changeover of the dedicated channel in the mobile station 202 is already complete, and hence the dedicated channel can be changed with the base station 201 and mobile station 202 in synchronization, thereby shortening the changeover operation and preventing a deterioration in response time during a dedicated channel changeover.

The pre-changeover dedicated channel is deleted in the control station 204 and base station 201 immediately after reception of the changeover completion notification IF1 from the mobile station 202, and hence, although the required time period lengthens due to retransmission, the period required for changing the dedicated channel can be held to a minimum.

Third Operating Procedure

Figure 5:
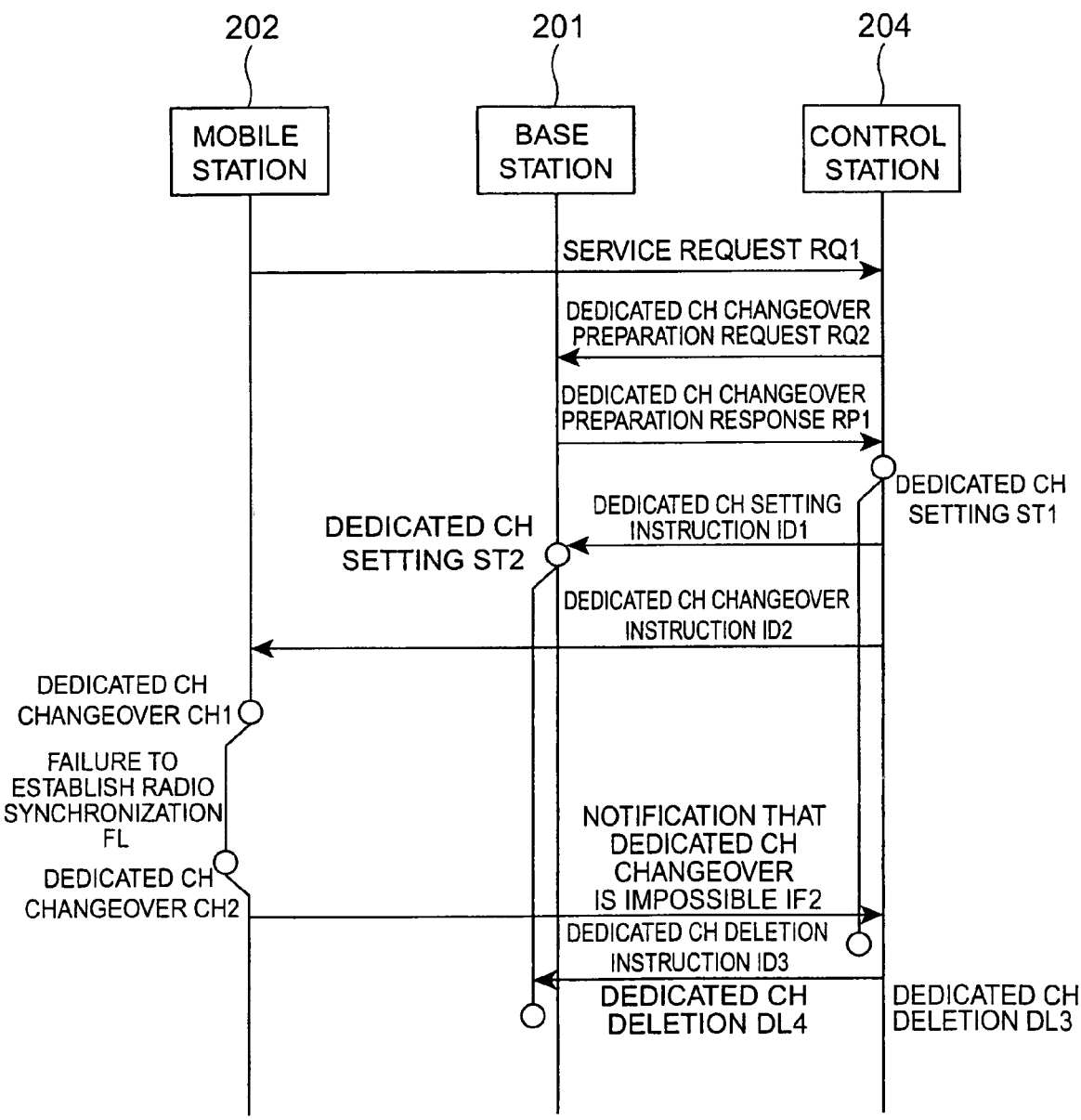
FIG. 5 is a chart showing a third operating procedure of the mobile station, base station, and control station during a changeover of the communicating dedicated channel.

A third operating procedure of the mobile communication system 1 executed during a changeover of the communicating dedicated channel will now be described. FIG. 5 is a chart showing a third operating procedure of the mobile station 202, base station 201, and control station 204 during a changeover of the communicating dedicated channel.

In FIG. 5, similar operations to those of FIG. 1 are performed from transmission of the service request RQ1 by the mobile station 202 to transmission of the dedicated channel changeover instruction ID2 by the control station 204. FIG. 5 illustrates a case in which, in response to the dedicated channel changeover instruction ID2, the mobile station 202 performs the dedicated channel changeover CH1 to change the dedicated channel, whereupon a failure to establish radio synchronization FL occurs for some reason on the post-changeover dedicated channel.

In this case, the mobile station 202 performs a dedicated channel changeover CH2 to return to the original pre-changeover dedicated channel, and after performing this dedicated channel changeover CH2, transmits a notification that dedicated channel changeover is impossible IF2 to the control station 204. Then, since the dedicated channel has not been changed as a result of the failure to change the dedicated channel in the mobile station 202, the control station 204 performs a dedicated channel deletion DL3 to delete the set post-changeover dedicated channel, and the base station 201 performs a dedicated channel deletion DL4 to delete the post-changeover dedicated channel. Thus communication is performed in the mobile communication system 1 using the pre-changeover dedicated channel.

The control station 204 also performs a dedicated channel retention operation in this series of operations, and hence the double retention period following the dedicated channel setting ST1 is secured. Hence, the original pre-changeover dedicated channel is retained in the control station 204 and base station 201 such that even when the mobile station 202 fails to change the dedicated channel and returns to the original dedicated channel, communication can be continued by returning to the original dedicated channel. As a result, mismatched conditions in the radio channels of the base station 201 and mobile station 202 do not occur.

Furthermore, the control station 204 and base station 201 delete the post-changeover dedicated channel immediately after receiving the notification of changeover failure IF2 from the mobile station 202, and hence the period required to change the dedicated channel can be held at a minimum, enabling an improvement in response.

Here, if the double retention period is not secured (in a case such as that illustrated in FIG. 8, for example) such that the original dedicated channel no longer exists following a dedicated channel changeover, control is required to reset a dedicated channel by returning to a common channel. In this case, time is required to restart communication. In the present invention, by contrast, the double retention period is secured, and hence there is no need for control to reset the dedicated channel by returning to the common channel. Thus in the mobile communication system 1, the time required to restart communication can be shortened.

Fourth Operating Procedure

Figure 6:
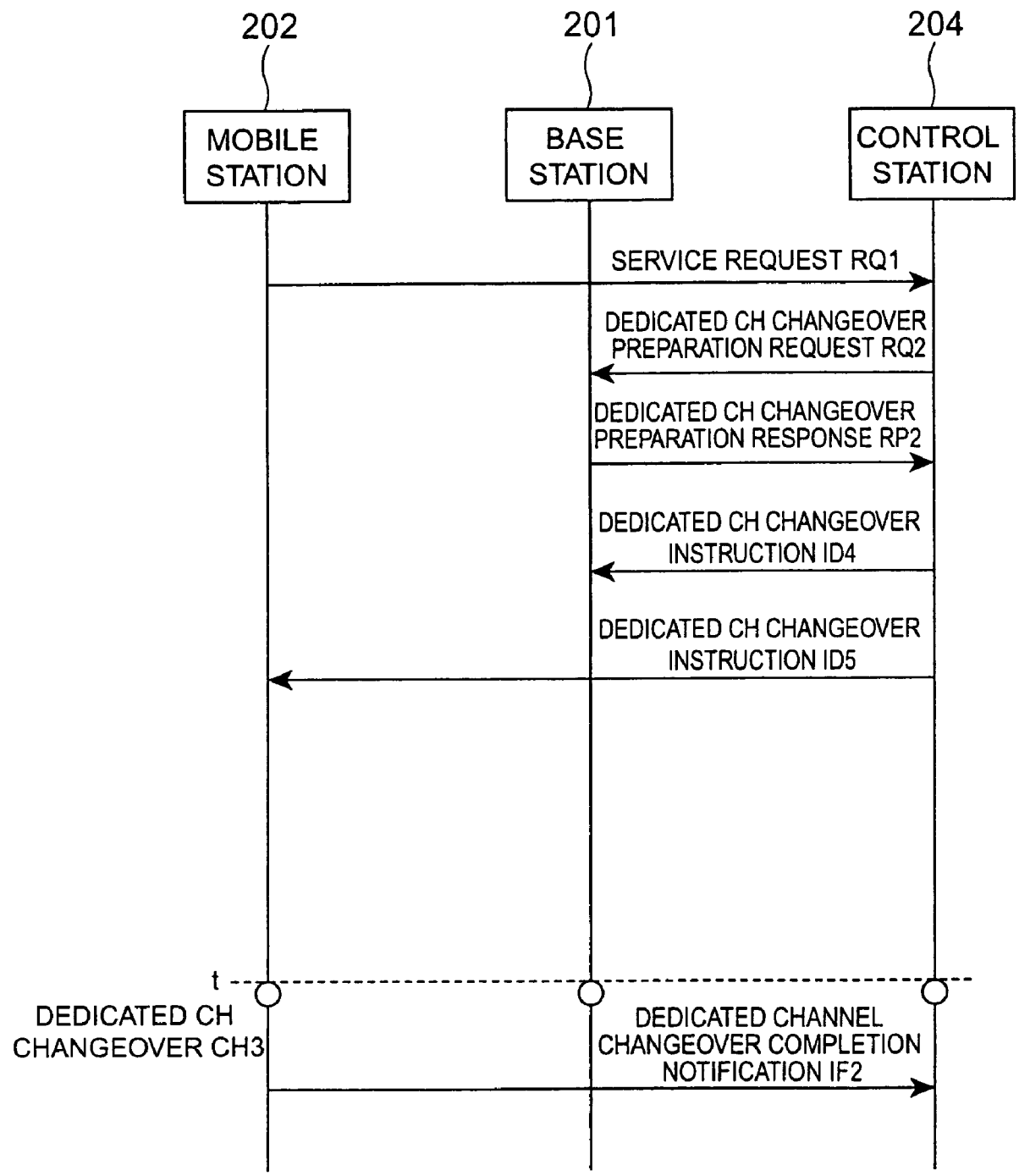
FIG. 6 is a chart showing a fourth operating procedure of the mobile station, base station, and control station during a changeover of the communicating dedicated channel.

A fourth operating procedure executed by the mobile communication system 1 during a changeover of the communicating dedicated channel will now be described. FIG. 6 is a chart showing a fourth operating procedure of the mobile station 202, base station 201, and control station 204 during a changeover of the communicating dedicated channel.

In the operating procedures described above, cases were envisaged in which a radio resource for setting a different dedicated channel to the communicating dedicated channel exists in the base station 201 when the dedicated channel changeover preparation request RQ2 is transmitted to the base station 201 by the control station 204. Depending on the communication condition and so on, however, such a radio resource may not exist. In such a case, a different dedicated channel to the communicating dedicated channel cannot be set, and hence the following operation is performed in the mobile communication system 1.

In FIG. 6, transmission of the service request RQ1 by the mobile station 202 and transmission of the dedicated channel changeover preparation request RQ2 by the control station 204 are identical to their counterparts in FIG. 1. However, in FIG. 6, it is determined that the base station 201, having received the dedicated channel changeover preparation request RQ2, does not possess a radio resource for setting a different dedicated channel. Hence a dedicated channel changeover preparation response RP2 is transmitted to the control station 204, informing the control station 204 of the absence of a radio resource.

Figure 7:
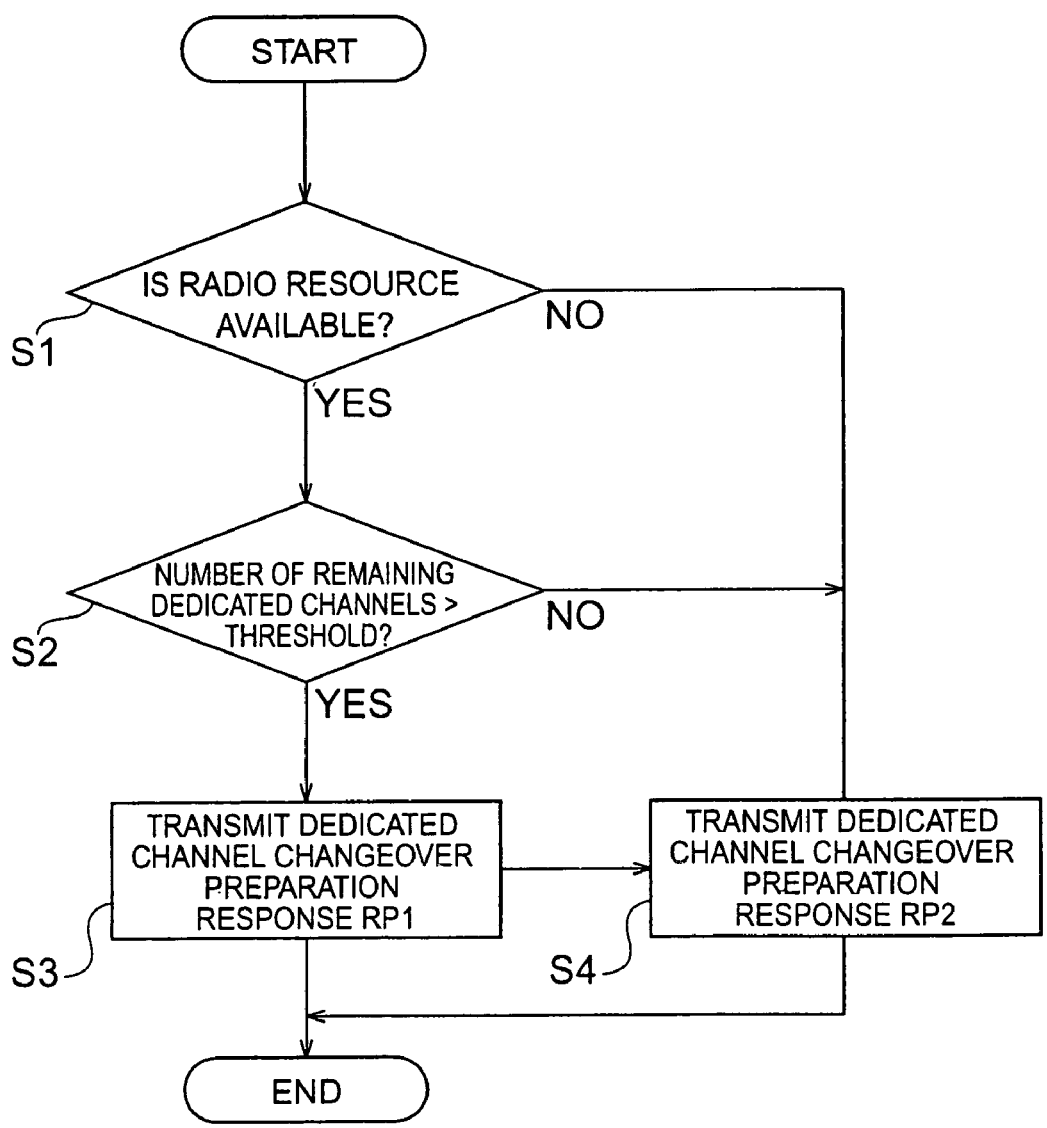
FIG. 7 is a flowchart showing a remaining channel checking procedure executed in the base station.

In the first through fourth operating procedures described above, the base station 201 checks whether or not a radio resource is available for setting a different dedicated channel upon reception of the dedicated channel changeover preparation request RQ2. Thus the base station 201 operates as remaining channel checking means to execute a remaining channel check according to the flowchart shown in FIG. 7. Note that in FIG. 7, "step" is abbreviated to "S".

More specifically, following the start of processing, the base station 201 advances to a step 1 to check whether or not a radio resource for setting a different dedicated channel exists. If a radio resource exists, the base station 201 advances to a step 2, and if not, the base station 201 advances to a step 4. After advancing to step 2, the base station 201 determines whether the number of remaining dedicated channels exceeds a threshold (a value larger than zero set in accordance with the communication congestion condition and so on). If so, the base station 201 advances to a step 3, and if not, the base station 201 advances to step 4. After advancing to step 3, the base station 201 transmits the dedicated channel changeover preparation response RP1 described above, and after advancing to step 4, the base station 201 transmits the dedicated channel changeover preparation response RP2, thus ending the remaining channel check.

In response to transmission of the dedicated channel changeover preparation response RP2 from the base station 201, the mode setting means 303 operates within the control station 204 to set an operating mode, whereby the operating mode is set to a timing specification mode. Then, as shown in FIG. 6, the control station 204 transmits the dedicated channel changeover instructions ID4, ID5 to the base station 201 and mobile station 202 respectively, specifying the timing t. By transmitting the dedicated channel changeover instructions ID4, ID5, the control station 204 instructs the base station 201 and mobile station 202 to change the dedicated channel, and thus the base station 201 and mobile station 202 perform a dedicated channel changeover CH3 simultaneously (at one time) at the timing t. The mobile station 202 then transmits the dedicated channel changeover completion notification IF1 to the control station 204, whereby the dedicated channel changeover operation ends.

As described above, the dedicated channel changeover instructions ID4, ID5 specifying the timing t are also transmitted in the operating procedure shown in FIG. 8, whereby the base station 201 and mobile station 202 change the dedicated channel simultaneously at the timing t. In the operating procedure of FIG. 8, however, no determination is made as to the presence of a radio resource in the base station 201, and the mode setting means 303 is not provided in the control station 206. Hence the base station 201 and mobile station 202 change the dedicated channel at the timing t regardless of whether a different dedicated channel to the communicating dedicated channel can be set, and as a result, a securable double retention period is not secured in the control station 206.

In the procedure shown in FIG. 6, on the other hand, the timing specification mode for changing the dedicated channel at the timing t is set only when it is determined that there is no radio resource on the base station 201 side, or in other words when only the communicating dedicated channel can be set. When a radio resource is available, the dedicated channel retention operation according to any of the first through third operating procedures is performed, thus securing the double retention period such that the actions and effects described above can be exhibited.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication system comprising:
   a control station in communication with a base station and a mobile station, wherein the control station is configured to establish a first dedicated channel with the mobile station via the base station; and
   the control station comprising:
   a dedicated channel control portion configured to establish a second dedicated channel while in communication through the first dedicated channel, wherein the first dedicated channel is different from the second dedicated channel; and
   the dedicated channel control portion is further configured to retain the first dedicated channel and the second dedicated channel, and communication is performed through the first dedicated channel and the second dedicated channel for a period of time that begins upon start of communication with the second dedicated channel and ends upon reception in the control station of one of a dedicated channel changeover notification or a changeover failure notification.

2. The mobile communication system of claim 1, wherein the control station further comprises:
   a mode setting portion configured to establish a dedicated channel retention mode to activate the dedicated channel control portion upon notification of a presence of a radio resource, wherein the radio resource is configured to replace the first dedicated channel with the second dedicated channel, and
   the mode setting portion further configured to establish a timing specification mode to inform the base station and the mobile station of a dedicated channel changeover timing upon notification of an absence of the radio resource.

3. A mobile communication system comprising:
   a control station in communications with a base station and a mobile station, wherein the control station is configured to establish a first dedicated channel as a communicating dedicated channel with the mobile station via the base station; and
   the control station comprises:
   a dedicated channel control portion configured to establish a second dedicated channel that is a different dedicated channel than the first dedicated channel during communication through the first dedicated channel such that both the first and the second dedicated channels are retained for a predetermined time period after establishment of the second dedicated channel; and
   a mode setting portion configured to establish a dedicated channel retention mode to activate the dedicated channel control portion in response to receipt of a radio resource present notification, wherein the dedicated control portion is configured to change over from the first dedicated channel to the second dedicated channel as the communicating dedicated channel; and
   the mode setting portion further configured to establish a timing specification mode to inform the base station and the mobile station of a dedicated channel changeover timing in response to receipt of a radio resource absent notification.

4. A mobile communication system comprising:
   a control station, a base station, and a mobile station, wherein the control station is configured to establish a first dedicated channel with the mobile station via the base station; and the control station is further configured to establish a second dedicated channel that is different from the first dedicated channel, during communication through the first dedicated channel, and the control station is further configured to retain both the first dedicated channel and the second dedicated channel for a predetermined time period after the second dedicated channel is established; and
   the control station is further configured to communicate through the first and the second dedicated channels for a period of time that commences upon establishment of the second dedicated channel until reception of one of a dedicated channel changeover completion notification or a changeover failure notification.

5. The mobile communication system of claim 4, wherein the control station is configured to complete changeover to the second dedicated channel in response to a radio resource present notification; and
   the control station is further configured to establish a timing specification mode to inform the base station and the mobile station of a dedicated channel changeover timing in response to a radio resource absence notification.

6. The mobile communication system of claim 4, wherein the control station is further configured to send a deleted second dedicated channel instruction in response to a changeover failure notification.

7. A mobile communication system comprising:
   a mobile station in communication with a base station, wherein the mobile station is configured to communicate through a first dedicated channel;
   the base station in communication with a control station wherein the control station is configured to establish, via the base station, a second dedicated channel for the mobile station that is different from the first dedicated channel, wherein the control station is further configured to retain the first dedicated channel and second dedicated channel for a predetermined time period after the second dedicated channel is established;
   wherein the mobile station is further configured to communicate through both the first dedicated channel and the second dedicated channel for the predetermined time period; and
   the control station is further configured to receive a radio resource indication, and the control station is further configured to establish a time limit specification in response to receipt of the radio resource indication, wherein the time limit specification informs the base station and the mobile station of a dedicated channel changeover timing in response to a radio resource absent notification.

8. A method to control a communication system comprising:
   a control station establishing a first dedicated channel for a mobile station;

the control station receiving a service request from the mobile station;

the control station transmitting a dedicated changeover preparation request to a base station;

the control station receiving a second dedicated channel availability indication, wherein the second dedicated channel availability indication indicates a second dedicated channel is available; and the control station activating the second dedicated channel in response to the secondary dedicated channel available indication, wherein the first dedicated channel and the second dedicated channel are simultaneously active for a predetermined time period following activation of the second dedicated channel.

9. The method of claim 8, further comprises:

the base station receiving the dedicated changeover preparation request;

the base station determining an availability of the second dedicated channel in response to the dedicated changeover preparation request; and the base station sending the second dedicated channel availability indication to the control station based on the availability of the second dedicated channel.

10. The method of claim 9, wherein the base station determining the availability of the second dedicated channel further includes:

determining a number of unassigned dedicated channels;

comparing the number of unassigned dedicated channels to a communication congestion threshold; and generating the second dedicated channel availability indication based on the communication congestion threshold, wherein the second dedicated channel availability indication is positive upon a first condition that the number of unassigned dedicated channels is greater than the communication congestion threshold.

11. The method of claim 9, wherein the base station determining the availability of the second dedicated channel further includes:

the base station determining a number of unassigned dedicated channels;

the base station comparing the number of unassigned dedicated channels to a communication congestion threshold; and the base station generating the second dedicated channel availability indication based on the communication congestion threshold, wherein the second dedicated channel availability indication is negative upon a second condition that the number of unassigned dedicated channels is less than the communication congestion threshold.

12. The method of claim 8, wherein the control station activating the second dedicated channel further comprises:

the control station sending a dedicated channel setting instruction to the base station;

the control station sending a dedicated changeover instruction to the mobile station; and the control station receiving a dedicated changeover completion indication from the mobile station.

13. The method of claim 8, further comprising:

the control station receiving a changeover completion notification;

the control station sending a delete dedicated channel instruction for the first dedicated channel in response to the changeover completion notification; and the base station terminating the first dedicated channel in response to the delete dedicated channel instruction.

14. The method of claim 8, further comprising:

the control station receiving a changeover failure notification from the mobile station; and the control station sending a delete dedicated channel instruction for the second dedicated channel to the base station in response to receipt of the changeover failure notification.

15. The method of claim 14, further comprising:

the base station deleting the second dedicated channel in response to the delete dedicated channel instruction for the second dedicated channel instruction.

16. The method of claim 8, further comprising:

the control station receiving a message from the mobile terminal indicative of one of a dedicated channel changeover completion notification and a changeover failure notification;

the control station sending a delete dedicated channel instruction for the first dedicated channel in response to the dedicated channel changeover completion notification; and the control station retaining the first dedicated channel in response to receipt of the changeover failure notification from the mobile station.

17. The method of claim 8, further comprising:

the mobile station transmitting the service request, wherein the service request is for a content of a service; and the control station selecting a second dedicated channel that is optimum for the content of the service.

18. A control station in eoniinunications with a base station and a mobile station, the control station comprising:

the control station configured to establish a first dedicated channel as a communicating dedicated channel with the mobile station; and a dedicated channel control portion configured to establish a second dedicated channel that is a different dedicated channel than the first dedicated channel during communication through the first dedicated channel such that both the first and the second dedicated channels are retained for a predetermined time period after establishment of the second dedicated channel; and a mode setting portion configured to establish a dedicated channel retention mode to activate the dedicated channel control portion in response to receipt of a radio resource present notification, wherein the dedicated control portion is configured to change over from the first dedicated channel to the second dedicated channel as the communicating dedicated channel; and the mode setting portion further configured to establish a timing specification mode to inform the base station and the mobile station of a dedicated channel changeover timing in response to receipt of a radio resource absent notification.

* * * * *

UNITED STATES PATENT AND TRADEMARK OFFICE
CERTIFICATE OF CORRECTION

PATENT NO. : 7,406,326 B2
APPLICATION NO. : 10/866276
DATED : July 29, 2008
INVENTOR(S) : Yasuhiro Kato et al.

It is certified that error appears in the above-identified patent and that said Letters Patent is hereby corrected as shown below:

Column 14
Line 34, delete the word "eoniinunications" and insert -- communications --.

Signed and Sealed this

Seventh Day of October, 2008

JON W. DUDAS
*Director of the United States Patent and Trademark Office*